United States Patent
Luo et al.

(10) Patent No.: US 12,395,303 B2
(45) Date of Patent: Aug. 19, 2025

(54) RESOURCE CONFIGURATION METHOD AND APPARATUS

(71) Applicant: HUAWEI TECHNOLOGIES CO., LTD., GuangDong (CN)

(72) Inventors: Zhihu Luo, Beijing (CN); Zhe Jin, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 392 days.

(21) Appl. No.: 18/163,601

(22) Filed: Feb. 2, 2023

(65) Prior Publication Data
US 2023/0188299 A1 Jun. 15, 2023

Related U.S. Application Data

(63) Continuation of application No. PCT/CN2020/107580, filed on Aug. 6, 2020.

(51) Int. Cl.
*H04L 27/26* (2006.01)
*H04L 5/00* (2006.01)
(Continued)

(52) U.S. Cl.
CPC .......... *H04L 5/0053* (2013.01); *H04L 5/0044* (2013.01); *H04W 72/044* (2013.01); *H04W 72/23* (2023.01)

(58) Field of Classification Search
CPC ... H04L 5/0053; H04L 5/0044; H04W 72/044
See application file for complete search history.

(56) References Cited

U.S. PATENT DOCUMENTS

2019/0215807 A1   7/2019  Hwang et al.
2019/0281587 A1*  9/2019  Zhang ............... H04W 72/23
(Continued)

FOREIGN PATENT DOCUMENTS

CN   109548149 A   3/2019
CN   110035513 A   7/2019
(Continued)

OTHER PUBLICATIONS

3GPP TSG RAN WG1 Meeting#94bis, R1-1811165 Title:Considerationof Mode 2 NR-V2X sidelink communication (Year: 2018).*
(Continued)

*Primary Examiner* — Faruk Hamza
*Assistant Examiner* — Abusayeed M Haque
(74) *Attorney, Agent, or Firm* — Rimon PC

(57) ABSTRACT

A resource configuration method and an apparatus are provided. A serial number $N_{BWP}^{start}$ of a common resource block (CRB) corresponding to a start resource block (RB) of a bandwidth part (BWP) configured by a network device for a terminal device and a quantity $L_{RBs}$ of consecutive RBs occupied by the BWP meet one or more of the following conditions: $N_{BWP}^{start}$ mod K=0; and/or $(N_{BWP}^{start}+L_{RBs})$ mod K=0, where mod is a remainder operation, and K is a positive integer. Based on the foregoing method, during BWP configuration, it can be ensured that the serial number of the start CRB of the BWP and/or a serial number of a CRB corresponding to a last RB included in the BWP each are/is an integer multiple of K. In this way, it can be ensured that more RBs can be used in a control-resource set (CORESET), thereby increasing resource utilization.

20 Claims, 5 Drawing Sheets

(51) Int. Cl.
  *H04W 72/044* (2023.01)
  *H04W 72/23* (2023.01)

(56) References Cited

U.S. PATENT DOCUMENTS

| | | | |
|---|---|---|---|
| 2019/0281588 A1* | 9/2019 | Zhang | H04W 52/08 |
| 2019/0357092 A1* | 11/2019 | Jung | H04W 36/0077 |
| 2020/0177328 A1* | 6/2020 | Guo | H04W 72/0446 |
| 2022/0131727 A1* | 4/2022 | Khoryaev | H04L 27/261 |
| 2022/0132344 A1* | 4/2022 | Zhou | H04W 24/08 |
| 2022/0132453 A1* | 4/2022 | Wei | H04W 56/003 |

FOREIGN PATENT DOCUMENTS

| | | |
|---|---|---|
| CN | 110113141 A | 8/2019 |
| CN | 110999479 A | 4/2020 |
| EP | 3651525 A1 | 5/2020 |
| EP | 3740002 A1 | 11/2020 |
| WO | 2019139444 A1 | 7/2019 |
| WO | 2020067967 A1 | 4/2020 |

OTHER PUBLICATIONS

3GPP TSG RAN WG1 Meeting#90bis, R1-1717078 Title:DL/UL resource allocation and TB size determination (Year: 2017).*
3gpp ts 38.214 V16.2.0: "3rd Generation Partnership Project; Technical Specification Group Radio Access Network; NR; Physical layer procedures for data (Release 16)", Jun. 2020; 163 total pages.
3GPP TS 38.213 V16.2.0: "3rd Generation Partnership Project; Technical Specification Group Radio Access Network; NR; Physical layer procedures for control (Release 16)", Jun. 2020; 176 total pages.

* cited by examiner

RESOURCE CONFIGURATION METHOD AND APPARATUS

CROSS-REFERENCE TO RELATED APPLICATIONS

This application is a continuation of International Application No. PCT/CN2020/107580, filed on Aug. 6, 2020, the disclosure of which is hereby incorporated by reference in its entirety.

TECHNICAL FIELD

This application generally relates to the field of wireless communication technologies, and in particular, to a resource configuration method and an apparatus.

BACKGROUND

In a fifth-generation (5G) wireless access system standard new radio (NR), a base station can configure one or more downlink bandwidth parts (BWP) for a terminal device. The base station may transmit a physical downlink shared channel (PDSCH) and a physical downlink control channel (PDCCH) to the terminal device in the BWP. To correctly receive the PDSCH, the terminal device needs to first demodulate related information that is required for receiving the PDSCH and that is included in downlink control information (DCI) carried by the PDCCH.

For a terminal device with a limited operating bandwidth, a base station has wasted resources in terms of a BWP configuration in a conventional technology of NR.

SUMMARY

An objective of implementations of this application is to provide a resource configuration method and an apparatus, to increase resource utilization.

According to a first aspect, an embodiment of this application provides a resource configuration method, including: a network device determines a downlink bandwidth parts (BWP) configured for a terminal device. The network device sends first information to the terminal device. The first information indicates a serial number $N_{BWP}^{start}$ of a common resource block (CRB) corresponding to a start resource block (RB) of the BWP and a quantity $L_{RBs}$ of consecutive RBs occupied by the BWP. The serial number $N_{BWP}^{start}$ of the CRB corresponding to the start RB of the BWP and the quantity $L_{RBs}$ of consecutive RBs occupied by the BWP meet one or more of the following conditions: $N_{BWP}^{start}$ mod K=0; and $(N_{BWP}^{start}+L_{RBs})$ mod K=0, where mod is a remainder operation, and K is a positive integer.

Based on the foregoing method, during BWP configuration, it is ensured that the serial number of the CRB corresponding to the start RB of the BWP and/or a serial number of a CRB corresponding to a last RB included in the BWP each are/is an integer multiple of K. In this way, it can be ensured that more RBs can be used in a control-resource set (CORESET), thereby increasing resource utilization.

In a possible implementation, $L_{RBs}$ further meets the following condition: $L_{RBs}$ is less than or equal to L, where L is a quantity of consecutive RBs included in a maximum transmission bandwidth supported by the terminal device or an operating bandwidth preferred by the terminal device.

Based on the foregoing method, during BWP configuration, it is ensured that the BWP is less than or equal to the maximum transmission bandwidth supported by the terminal device or the operating bandwidth preferred by the terminal device, thereby helping remove invalid indication information of a part exceeding the maximum transmission bandwidth supported by the terminal device or the operating bandwidth preferred by the terminal device, and further reducing signaling overheads in terms of a BWP configuration.

In a possible implementation, $L_{RBs}$ further meets the following condition: $L_{RBs}$ mod K=0.

In a possible implementation, the method further includes: the network device sends second information to the terminal device. The second information indicates a frequency domain resource of a CORESET configured in the BWP. A quantity of bits included in the second information is determined based on the maximum transmission bandwidth supported by the terminal device or the operating bandwidth preferred by the terminal device.

Based on the foregoing method, the quantity of bits included in the second information indicating the frequency domain resource of the CORESET is no longer 45 fixed bits, but determined based on the maximum transmission bandwidth supported by the terminal device or the operating bandwidth preferred by the terminal device, so that signaling overheads during CORESET configuration can be reduced.

In a possible implementation, the quantity of bits included in the second information is $\lfloor \log_2 N \rfloor$, $\lceil \log_2 N \rceil$, $\lfloor \log_2(N/6) \rfloor$, or $\lceil \log_2(N/6) \rceil$. N is a quantity of consecutive RBs included in the maximum transmission bandwidth supported by the terminal device or the operating bandwidth preferred by the terminal device, $\lfloor \ \rfloor$ represents rounding down, and $\lceil \ \rceil$ represents rounding up.

In a possible implementation, the first information is an index value of a resource indication value (RIV), or the first information is a RIV.

In a possible implementation, the method further includes: the network device receives third information from the terminal device. The third information indicates the maximum transmission bandwidth supported by the terminal device or the operating bandwidth preferred by the terminal device. The network device determines, based on the third information, the maximum transmission bandwidth supported by the terminal device or the operating bandwidth preferred by the terminal device.

In a possible implementation, K is a preset value, or a value of K is sent by the network device to the terminal device.

According to a second aspect, this application further provides a communication apparatus, and the communication apparatus has a function of implementing any method provided in the foregoing first aspect. The communication apparatus may be implemented by hardware, or may be implemented by hardware executing corresponding software. The hardware or the software includes one or more units (e.g., circuits) or modules corresponding to the function.

In a possible implementation, the communication apparatus includes a processor. The processor is configured to support the communication apparatus in executing corresponding functions of the network device in the method described above. The communication apparatus may further include a memory. The memory may be coupled to the processor, and stores program instructions and data that are necessary for the communication apparatus. Optionally, the communication apparatus further includes a communication interface, and the communication interface is configured to support communication between the communication apparatus and a terminal device or the like.

In a possible implementation, the communication apparatus includes corresponding functional units (e.g., circuits) that are separately configured to perform the steps in the foregoing method. The function may be implemented by hardware, or may be implemented by hardware executing corresponding software. The hardware or the software includes one or more units corresponding to the function.

In a possible implementation, a structure of the communication apparatus includes a processing unit (e.g., a processing circuit) and a communication unit (e.g., a communication circuit). These units may execute corresponding functions in the foregoing method examples. For details, refer to the descriptions in the method provided in the first aspect. Details are not described herein.

According to a third aspect, this application provides a resource configuration method, including: a terminal device receives first information from a network device. The terminal device determines a BWP based on the first information. The first information indicates a serial number $N_{BWP}^{start}$ of a CRB corresponding to a start RB of the BWP and a quantity $L_{RBs}$ of consecutive RBs occupied by the BWP. The serial number $N_{BWP}^{start}$ of the CRB corresponding to the start RB of the BWP and the quantity $L_{RBs}$ of consecutive RBs occupied by the BWP meet one or more of the following conditions: $N_{BWP}^{start}$ mod K=0; and $(N_{BWP}^{start}+L_{RBs})$ mod K=0, where mod is a remainder operation, and K is a positive integer.

In a possible implementation, $L_{RBs}$ further meets the following conditions: $L_{RBs}$ is less than or equal to L, where L is a quantity of consecutive RBs included in a maximum transmission bandwidth supported by the terminal device or an operating bandwidth preferred by the terminal device.

In a possible implementation, $L_{RBs}$ further meets the following condition: $L_{RBs}$ mod K=0.

In a possible implementation, the method further includes: the terminal device receives second information from the network device. The second information indicates a frequency domain resource of a CORESET configured in the BWP. A quantity of bits included in the second information is determined based on the maximum transmission bandwidth supported by the terminal device or the operating bandwidth preferred by the terminal device.

In a possible implementation, the quantity of bits included in the second information is $\lfloor \log_2 N \rfloor$, $\lceil \log_2 N \rceil$, $\lfloor \log_2(N/6) \rfloor$, or $\lceil \log_2(N/6) \rceil$. N is a quantity of consecutive RBs included in the maximum transmission bandwidth supported by the terminal device or the operating bandwidth preferred by the terminal device, $\lfloor \; \rfloor$ represents rounding down, and $\lceil \; \rceil$ represents rounding up.

In a possible implementation, the first information is an index value of a RIV, or the first information is a RIV.

In a possible implementation, K is a preset value, or a value of K is sent by the network device to the terminal device.

According to a fourth aspect, this application further provides a communication apparatus, and the communication apparatus has a function of implementing any method provided in the foregoing third aspect. The communication apparatus may be implemented by hardware, or may be implemented by hardware executing corresponding software. The hardware or the software includes one or more units or modules corresponding to the function.

In a possible implementation, the communication apparatus includes a processor. The processor is configured to support the communication apparatus in executing corresponding functions of the terminal device in the method described above. The communication apparatus may further include a memory. The memory may be coupled to the processor, and stores program instructions and data that are necessary for the communication apparatus. Optionally, the communication apparatus further includes a communication interface, and the communication interface is configured to support communication between the communication apparatus and the network device or the like.

In a possible implementation, the communication apparatus includes corresponding functional units that are separately configured to perform the steps in the foregoing method. The function may be implemented by hardware, or may be implemented by hardware executing corresponding software. The hardware or the software includes one or more units corresponding to the function.

In a possible implementation, a structure of the communication apparatus includes a processing unit and a communication unit. These units may execute corresponding functions in the foregoing method examples. For details, refer to the descriptions in the method provided in the third aspect. Details are not described herein.

According to a fifth aspect, a computer-readable storage medium is provided, and is configured to store a computer program. The computer program includes instructions for performing the method in any one of the first aspect or the possible implementations of the first aspect.

According to a sixth aspect, a computer-readable storage medium is provided, and is configured to store a computer program. The computer program includes instructions for performing the method in any one of the third aspect or the possible implementations of the third aspect.

According to a seventh aspect, a computer program product is provided, and the computer program product includes computer program code. When the computer program code is run on a computer, the computer is enabled to perform the method in any one of the first aspect or the possible implementations of the first aspect.

According to an eighth aspect, a computer program product is provided, and the computer program product includes computer program code. When the computer program code is run on a computer, the computer is enabled to perform the method in any one of the third aspect or the possible implementations of the third aspect.

According to a ninth aspect, this application provides a chip, including a processor. The processor is coupled to a memory, and is configured to execute a computer program or instructions stored in the memory. When the processor executes the computer program or instructions, the method in any one of the first aspect or the possible implementations of the first aspect is implemented.

According to a tenth aspect, this application provides a chip, including a processor. The processor is coupled to a memory, and is configured to execute a computer program or instructions stored in the memory. When the processor executes the computer program or instructions, the method in any one of the third aspect or the possible implementations of the third aspect is implemented.

According to an eleventh aspect, this application provides a communication apparatus. The communication apparatus includes a processor, a memory, and a transceiver. The transceiver is configured to receive or send a signal. The memory is configured to store a computer program or instructions. The processor is configured to invoke the computer program or instructions from the memory to perform the method in any one of the first aspect or the possible implementations of the first aspect.

According to a twelfth aspect, this application provides a communication apparatus. The communication apparatus includes a processor, a memory, and a transceiver. The transceiver is configured to receive or send a signal. The memory is configured to store a computer program or instructions. The processor is configured to invoke the computer program or instructions from the memory to perform the method in any one of the third aspect or the possible implementations of the third aspect.

According to a thirteenth aspect, this application provides a communication system, including the communication apparatus provided in the second aspect and the communication apparatus provided in the fourth aspect.

DESCRIPTION OF EMBODIMENTS

The following further describes in detail embodiments of this application with reference to the accompanying drawings.

The technical solutions of embodiments of this application may be applied to various communication systems, such as a global system for mobile communications (GSM), a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a universal mobile telecommunication system (UMTS), a worldwide interoperability for microwave access (WiMAX) communication system, a future 5th generation (5G) system, or a new radio (NR) system. This is not limited herein.

In embodiments of this application, a terminal device may be a device with a wireless transceiver function or a chip that can be disposed in any device, or may be referred to as user equipment (UE), an access terminal, a subscriber unit, a subscriber station, a mobile station, a remote station, a remote terminal, a mobile device, a user terminal, a wireless communication device, a user agent, or a user apparatus. The terminal device in embodiments of this application may be a mobile phone, a tablet (e.g., Pad), a computer with a wireless transceiver function, a virtual reality (VR) terminal, an augmented reality (AR) terminal, a wireless terminal in industrial control, a wireless terminal in self-driving, a wireless terminal in remote medical, a wireless terminal in a smart grid, a wireless terminal in transportation safety, a wireless terminal in a smart city, a wireless terminal in a smart home, or the like.

A network device may be a next-generation NodeB (gNB) in an NR system, an evolved NodeB (eNB) in an LTE system, a base transceiver station (BTS) in a global system for mobile communications (GSM) system or a code division multiple access (CDMA) system, a NodeB (NB) in a wideband code division multiple access (WCDMA) system, or the like.

Figure 1:
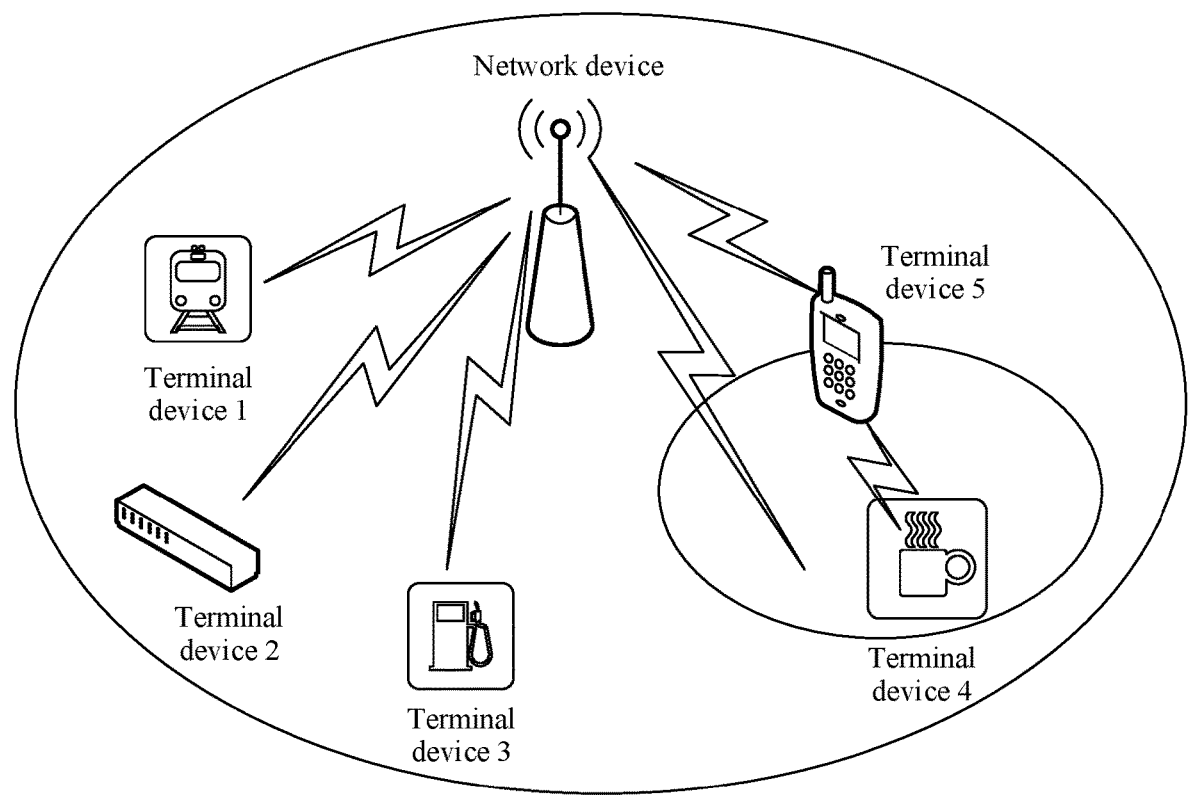
FIG. 1 is a schematic diagram of a network architecture according to an embodiment of this application.

Embodiments of this application may be applied to a network supporting an Internet of things (IoT) technology. As shown in FIG. 1, a network device and a terminal device 1 to a terminal device 5 form a communication system. In the communication system, the network device sends information to one or more of the terminal device 1 to the terminal device 5. In addition, the terminal device 4 and the terminal device 5 also form a communication system. In the communication system, the terminal device 5 may send information to the terminal device 4.

Some technical terms used in this application are described below first.

1. Subcarrier: In an orthogonal frequency division multiplexing (OFDM) system, a frequency domain resource is divided into some sub-resources, and each frequency domain sub-resource may be referred to as a subcarrier. The subcarrier may also be understood as a minimum granularity of the frequency domain resource.

2. Subcarrier spacing: a spacing value between center locations or peak locations of two adjacent subcarriers in frequency domain in an OFDM system. For example, a subcarrier spacing in an LTE system is 15 kHz or the like, and a subcarrier spacing in an NR system may be 15 kHz, 30 kHz, 60 kHz, 120 kHz, 240 kHz, or the like.

The subcarrier spacing in the NR system may be configured by using a network device. For example, if a subcarrier spacing configuration $\mu$ 1 is equal to 0, a corresponding subcarrier spacing is 15 kHz; if a subcarrier spacing configuration $\mu$ is equal to 1, a corresponding subcarrier spacing is 30 kHz; if a subcarrier spacing configuration $\mu$ is equal to 2, a corresponding subcarrier spacing is 60 kHz; if a subcarrier spacing configuration $\mu$ is equal to 3, a corresponding subcarrier spacing is 120 kHz; or if a subcarrier spacing configuration $\mu$ is equal to 4, a corresponding subcarrier spacing is 240 kHz.

3. Resource block: N consecutive subcarriers in frequency domain may be referred to as one resource block. For example, one resource block in an LTE system includes 12 subcarriers, and one resource block in an NR system also includes 12 subcarriers. As a communication system evolves, a quantity of subcarriers included in one resource block may also be another value.

4. Slot: In an NR system, a slot length is related to a subcarrier spacing. A length of one slot corresponding to a subcarrier spacing of 15 kHz is 1 ms, a length of one slot corresponding to a subcarrier spacing of 30 kHz is ½=0.5 ms, a length of one slot corresponding to a subcarrier spacing of 60 kHz is ¼=0.25 ms, a length of one slot corresponding to a subcarrier spacing of 120 kHz is ⅛=0.125 ms, and a length of one slot corresponding to a subcarrier spacing of 240 kHz is 1/16=0.0625 ms.

A basic time unit for downlink resource scheduling in NR is one slot. Generally, one slot includes 14 OFDM symbols in time. In time domain, data transmission in an NR system is organized into frames with a time length of 10 ms, each frame is divided into 10 subframes with a same size and a length of 1 ms, and each subframe may include one or more slots (this is determined based on a subcarrier spacing, and when the subcarrier spacing is 15 kHz, each subframe includes one slot). Each frame is identified by using one system frame number (SFN), and a period of the SFN is equal to 1024. Therefore, the SFN repeats itself after 1024 frames.

5. Subframe: A time length of one subframe in an NR system is 1 ms.

6. Half-frame: A time length of one half-frame in an NR system is 5 ms, each frame may be divided into two half-frames, and each half-frame includes five subframes. For example, a half-frame 0 includes a subframe 0 to a subframe 4, and a half-frame 1 includes a subframe 5 to a subframe 9.

7. Frame: A time length of one frame in an NR system is 10 ms, and each frame includes 10 subframes.

8. OFDM symbol: a smallest time unit in time domain in an OFDM system. In an NR system, for a normal cyclic prefix, one slot includes 14 OFDM symbols.

9. BWP: a new concept proposed in an NR standard, and is a consecutive bandwidth resource configured on a network side for a terminal device. In this way, a bandwidth is flexibly configured between the network side and a terminal device side.

Figure 2:
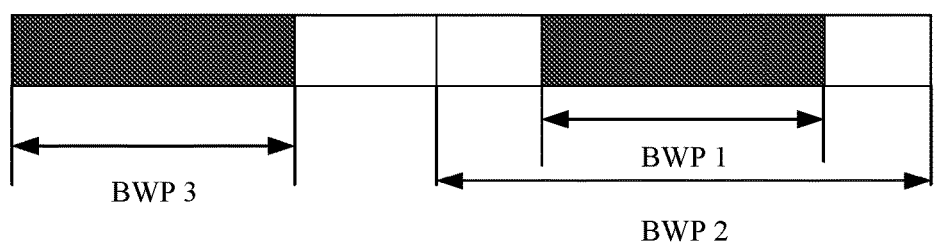
FIG. 2 is a schematic diagram of a bandwidth part (BWP) configuration according to an embodiment of this application.

The BWP includes consecutive resource blocks (RB) in frequency domain, and the BWP is a subset within a bandwidth of the terminal device. A minimum granularity of the BWP in frequency domain is one resource block. A system can configure one or more BWPs for the terminal device, and the plurality of BWPs may overlap in frequency domain. As shown in FIG. 2, a base station configures three BWPs for a terminal device. A BWP 1 overlaps a BWP 2, and the BWP 1 does not overlap a BWP 3.

In an NR system, a BWP may be indicated by using BWP configuration information. A base station notifies a terminal device of the BWP configuration information by using radio resource control (RRC) signaling. A frequency domain location of the BWP is indicated by using a location and bandwidth field. An offset $RB_{start}$ and a length $L_{RBs}$ may be determined based on a value of the location and bandwidth field. A serial number of a common resource block corresponding to a start resource block of a final BWP is $N_{BWP}^{start} = O_{carrier} + RB_{start}$, $O_{carrier}$ indicates a spacing between a preset reference point, point A, and a lowest usable subcarrier of a carrier on which the BWP is located, and the spacing is represented by using a quantity of RBs.

10. Control-resource set (CORESET): In NR, a physical downlink control channel (PDCCH) is transmitted on one configurable CORESET. The CORESET is a time-frequency resource for sending a PDCCH. A plurality of CORESETs may be configured in one BWP, and the CORESET does not necessarily occupy an entire system bandwidth in frequency domain. The CORESET is similar to a control region that is used for transmitting a PDCCH and that is on one subframe in an LTE system, but a time-frequency structure of the CORESET is more flexible. In LTE, a PDCCH always occupies an entire system bandwidth. A PDCCH in NR does not need to occupy an entire system bandwidth. Such a design of the CORESET enables NR to support terminal devices with different bandwidth capabilities. For example, some of the terminal devices may not support a very large bandwidth, for example, 100 MHz. In addition, the design of the CORESET is beneficial to forward compatibility.

Figure 3:
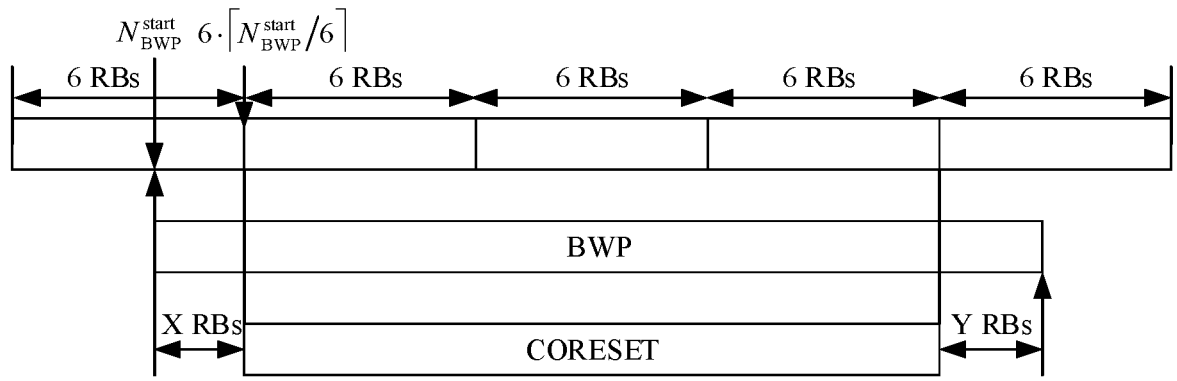
FIG. 3 is a schematic diagram of a location of a control-resource set (CORESET)

In a current standard, an index of a first common resource block (CRB) of the first group including six RBs that is in a frequency domain resource of the CORESET is 6. $\lceil N_{BWP}^{start}/6 \rceil$. $N_{BWP}^{start}$ is a start CRB of the BWP. As shown in FIG. 3, a start location of a BWP is spaced from a start location of the first RB group in the BWP by X RBs, and an end location of the BWP is spaced from an end location of the last RB group in the BWP by Y RBs. If neither X nor Y is an integer multiple of 6, (X+Y) cannot be configured as a CORESET, causing waste of resources.

The frequency domain resource of the CORESET may be indicated by using a frequency domain resource (frequencyDomainResources) field, and the frequency domain resource field is a bitmap with a fixed length of 45. Each bit in the bitmap is in a one-to-one correspondence with a non-overlapping group including 6 consecutive PRBs, and is numbered in ascending order of PRB indexes in one downlink BWP.

11. Point A: It indicates a common reference point of a resource block. A location of the point A is configured by a network device.

12. CRB: For a subcarrier spacing configuration μ, CRBs are incrementally numbered starting from 0 in ascending order of frequencies. For the subcarrier spacing configuration μ, the point A corresponds to a center location of a subcarrier 0 of a CRB 0. Therefore, if the location of the point A is determined, a serial number of each CRB is determined. Each RB in the BWP corresponds to a serial number $n_{CRB}^{\mu}$ of a CRB. In the BWP, each RB also has its own serial number. The serial number of the RB in the BWP is denoted as $n_{PRB}^{\mu}$. For a relationship between $n_{CRB}^{\mu}$ and $n_{PRB}^{\mu}$, refer to a conventional technology of NR, $n_{CRB}^{\mu} = n_{PRB}^{\mu} + N_{BWP}^{start,\mu}$, and $N_{BWP}^{start,\mu}$ is a serial number of a CRB corresponding to a start RB of the BWP.

In this application, "at least one" means one or more, and "a plurality of" means two or more. "And/or" describes an association relationship for describing associated objects and indicates that three relationships may exist. For example, A and/or B may indicate the following cases: Only A exists, both A and B exist, and only B exists, where A and B may be singular or plural. The character "/" usually indicates an "or" relationship between associated objects. "At least one of the following items (pieces)" or a similar expression thereof means any combination of these items, including any combination of singular items or plural items. For example, at least one item of a, b, and c may indicate: a, b, c, a and b, a and c, b and c, or a, b, and c, where a, b, and c may be singular or plural.

A network architecture and a service scenario described in embodiments of this application are intended to describe the technical solutions in embodiments of this application more clearly, and do not constitute any limitation on the technical solutions provided in embodiments of this application. A person of ordinary skill in the art may know that with evolution of the network architecture and emergence of a new service scenario, the technical solutions provided in embodiments of this application are also applicable to similar technical problems.

In embodiments of this application, interaction between a terminal device and a network device is used as an example for description. A method provided in embodiments of this application may be further applied to interaction between other execution bodies, for example, may be interaction between a chip or module in the terminal device and a chip or module in the network device. When the execution body is a chip or module, refer to descriptions in embodiments of this application. Details are not described herein again.

Figure 4:
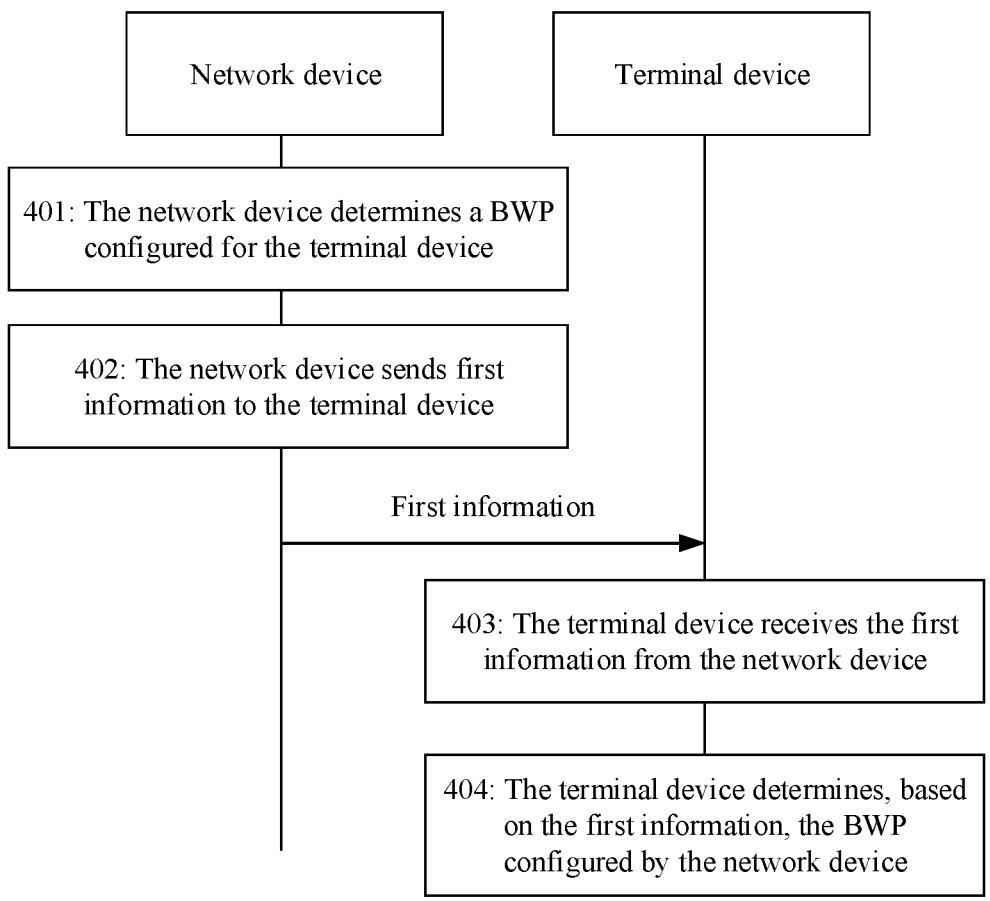
FIG. 4 is a schematic flowchart of a resource configuration method according to an embodiment of this application.

With reference to the foregoing descriptions, FIG. 4 is a schematic flowchart of a resource configuration method according to an embodiment of this application. Referring to FIG. 4, the method includes the following steps.

Step 401: A network device determines a BWP configured for a terminal device.

It should be noted that the network device may configure one or more BWPs for the terminal device. In a procedure in FIG. 4, one BWP is used as an example for description. This does not mean that only one BWP is configured. When the network device configures another BWP for the terminal device, a configuration and an indication method of each BWP are the same, and are not described herein.

Step 402: The network device sends first information to the terminal device.

The first information indicates a serial number $N_{BWP}^{start}$ of a CRB corresponding to a start RB of the BWP and a quantity $L_{RBs}$ of consecutive RBs occupied by the BWP. The serial number $N_{BWP}^{start}$ of the CRB corresponding to the start RB of the BWP and the quantity $L_{RBs}$ of consecutive RBs occupied by the BWP meet one or more of the following conditions:

$N_{BWP}^{start}$ mod K=0; and $(N_{BWP}^{start}+L_{RBs})$ mod K=0, where mod is a remainder operation, and K is a positive integer; $N_{BWP}^{start}+L_{RBs}1$ may be considered as a serial number of a CRB corresponding to an end RB of the BWP; and $L_{RBs}$ may be considered as a length of the BWP.

Further, optionally, $L_{RBs}$ may further meet one or more of the following conditions:

$L_{RBs}$ is less than or equal to L, where L is a quantity of consecutive RBs included in a maximum transmission bandwidth supported by the terminal device or an operating bandwidth preferred by the terminal device; and $L_{RBs}$ mod K=0.

It should be noted that K is a preset value, or a value of K may be sent by the network device to the terminal device. When the value of K is the preset value, optionally, K is 6.

Considering that a narrowband terminal device or a terminal device with a limited operating bandwidth may be introduced for a low-cost Internet of things scenario in a subsequent NR system, the network device needs to determine the value of K with reference to a quantity of RBs occupied by a control channel element (CCE) of a control channel of a terminal device with a different operating bandwidth and a quantity of RBs corresponding to a resource block group (RBG) used by a data channel of the terminal device with the different operating bandwidth during resource allocation, and notifies the terminal device of the value. Details depend on implementation of the network device. The following provides several examples. The value of K may be a minimum value, a maximum value, or the like in the quantity of RBs occupied by the CCE and the quantity of RBs corresponding to the RBG. A principle used when the network device determines the value of K may be to avoid occurrence of a resource fragment as far as possible during resource allocation. The resource fragment means that this part of resource is not allocated to the narrowband terminal device for use and cannot be allocated to a broadband terminal device for use. The broadband terminal device herein may be a terminal device that supports an enhanced mobile bandwidth (eMBB) service in NR. An operating bandwidth of the broadband terminal device is up to 100 MHz in an FR1 and up to 400 MHz in an FR2. The narrowband terminal device may be a terminal device with a limited operating bandwidth. A value of the specific limited bandwidth is not limited in this embodiment. For example, the narrowband terminal device may be a terminal device whose operating bandwidth is less than or equal to 20 MHz in the FR1 and/or less than or equal to 50 MHz in the FR2.

It should be noted that the first information may be sent by using RRC signaling, a system message, or a media access control control element (MAC CE), for example, may be carried by using a location and bandwidth field in the RRC signaling.

Step 403: The terminal device receives the first information from the network device.

Step 404: The terminal device determines, based on the first information, the BWP configured by the network device.

Based on the foregoing method, during BWP configuration, it is ensured that the serial number of the start CRB of the BWP and/or a serial number of a CRB corresponding to a last RB included in the BWP each are/is an integer multiple of K. In this way, it can be ensured that more RBs can be used in a CORESET, thereby increasing resource utilization.

In some embodiments, the first information may be an index value of a resource indication value (RIV), or the first information may be the RIV. Certainly, the first information may alternatively be implemented in another manner. This is not limited in this embodiment of this application. For example, when the first information is the index value of the RIV, index values of RIVs that meet the foregoing condition may be sequentially 0, 1, 2, . . . , and N−1, where 0 represents an index value of a minimum RIV that meets the foregoing condition, N−1 represents an index value of a maximum RIV that meets the foregoing condition, and N is a quantity of RIVs that meet the foregoing condition. In this case, the value indicated by the first information may be one of 0 to N−1.

It should be noted that a manner of determining the RIV may be as follows:

if $L_{RBs}-1 \leq \lfloor N_{BWP}^{size}/2 \rfloor$, $RIV=N_{BWP}^{size}(L_{RBs}-1)+RB_{start}$, or otherwise $RIV=N_{BWP}^{size}(N_{BWP}^{size}-L_{RBs}+1)+(N_{BWP}^{size}-RB_{start})$, where $\lfloor \ \rfloor$ represents rounding down, $L_{RBs} \geq 1$ and is not greater than $N_{BWP}^{size}-RB_{start}$, and a value of $N_{BWP}^{size}$ is preconfigured, for example, the following is usually configured: $N_{BWP}^{size}=275$.

Figure 5:
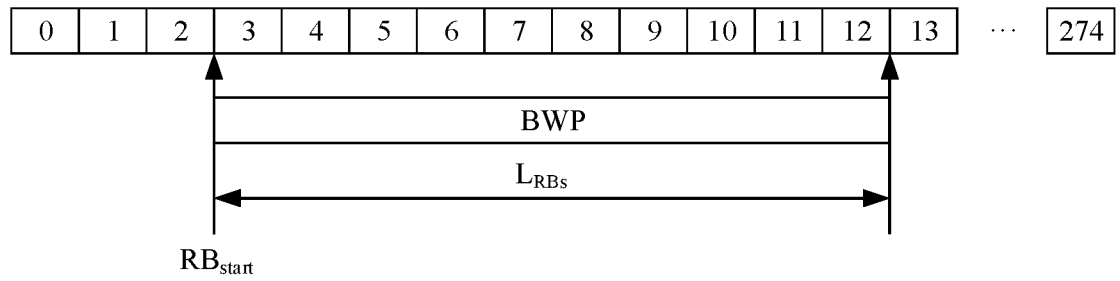
FIG. 5 is a schematic diagram of a BWP according to an embodiment of this application.

For example, as shown in FIG. 5, assuming that $RB_{start}$ is 3, $L_{RBs}$ is 10, and $N_{BWP}^{size}=275$. Because $L_{RBs}-1= 9 \leq \lfloor N_{BWP}^{size}/2 \rfloor=138$, $RIV=N_{BWP}^{size}(L_{RBs}-1)+RB_{start}=275 \times (10-1)+3=2478$.

When the RIV indicated by the first information is 2478, it indicates that an offset RB start of the BWP is 3, and the length $L_{RBs}$ is 10.

With reference to the foregoing example, when the terminal device determines, based on the first information, that the RIV is 2478, RB start and $L_{RBs}$ may be determined in the following manner.

Step 1: Determine a value of $\lfloor RIV/N_{BWP}^{size} \rfloor + RIV$ mod $N_{BWP}^{size}$.

Step 2: If $\lfloor RIV/N_{BWP}^{size} \rfloor + RIV$ mod $N_{BWP}^{size} < N_{BWP}^{size}$, determine that $RB_{start}=RIV$ mod $N_{BWP}^{size}$, and $L_{RBs}=\lfloor RIV/N_{BWP}^{size} \rfloor +1$; or if $\lfloor RIV/N_{BWP}^{size} \rfloor + RIV$ mod $N_{BWP}^{size} \geq N_{BWP}^{size}$, determine that $RB_{start}=N_{BWP}^{size}-RIV$ mod $N_{BWP}^{size}-1$ and $L_{RBs}=N_{BWP}^{size}-\lfloor RIV/N_{BWP}^{size} \rfloor +1$.

$\lfloor \ \rfloor$ represents rounding down, $\lceil \ \rceil$ represents rounding up, and mod represents a modulo operation.

Figure 6:
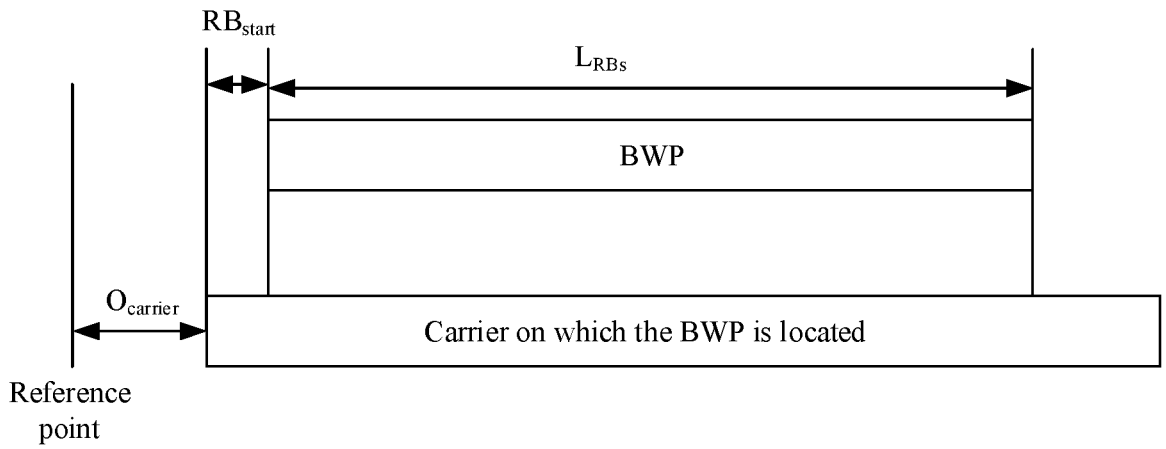
FIG. 6 is a schematic diagram of a BWP according to an embodiment of this application.

How to determine the BWP based on a reference point (Point A), $RB_{start}$, and $L_{RBs}$ is described below with reference to FIG. 6. In FIG. 6, the reference point is preconfigured, and $RB_{start}$ and $N_{BWP}^{start}$ may meet the following relationship:

$N_{BWP}^{start} = O_{carrier} + RB_{start}$, where $O_{carrier}$ indicates a spacing between a preset reference point and a lowest usable subcarrier of a carrier on which the BWP is located, the spacing is represented by using a quantity of RBs, and a value of $O_{carrier}$ may also be pre-configured.

It can be learned from the foregoing descriptions that the serial number $N_{BWP}^{start}$ of the CRB corresponding to the start RB of the BWP may be determined based on $RB_{start}$, so that consecutive $L_{RBs}$ RBs beginning from the start RB can be used as RBs included in the BWP.

Figure 7:
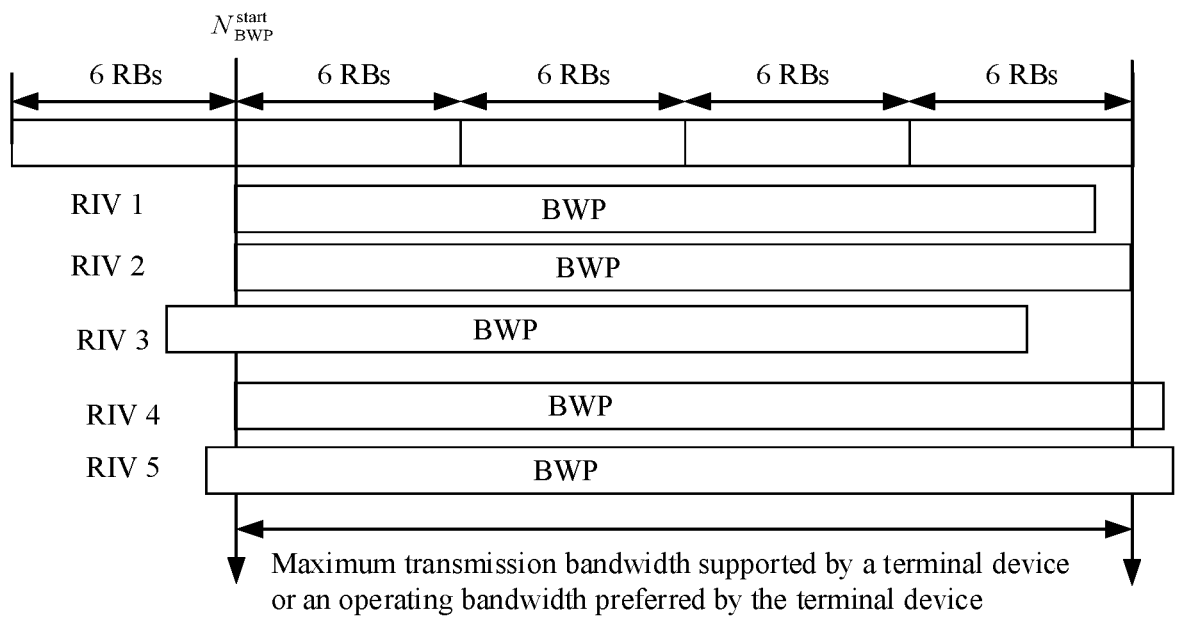
FIG. 7 is a schematic diagram of a BWP according to an embodiment of this application.

Further, with reference to the foregoing descriptions, as shown in FIG. 7, using K=6 as an example, assuming that there are currently five BWPs, corresponding RIVs are respectively a RIV 1 to a RIV 5. $N_{BWP}^{start}$ and $L_{RBs}$ determined based on the RIV 1 and the RIV 2 meet the condition in the procedure in FIG. 4, and at least one of $N_{BWP}^{start}$ and $L_{RBs}$ determined based on the RIV 3, the RIV 4, and the RIV 5 does not meet the condition in the procedure in FIG. 4. When the network device needs to configure a plurality of BWPs for the terminal device, a value of a RIV that does not meet the condition may be removed, and only a value of a RIV that meets the condition is configured, thereby reducing signaling overheads.

It should be noted that, the maximum transmission bandwidth supported by the terminal device or the operating bandwidth preferred by the terminal device may be indicated by the terminal device to the network device. For example, the terminal device may send third information to the network device, and the third information indicates the maximum transmission bandwidth supported by the terminal device or the operating bandwidth preferred by the terminal device. Some implementations of the third information is not limited in this embodiment of this application. Details are not described herein.

Figure 8:
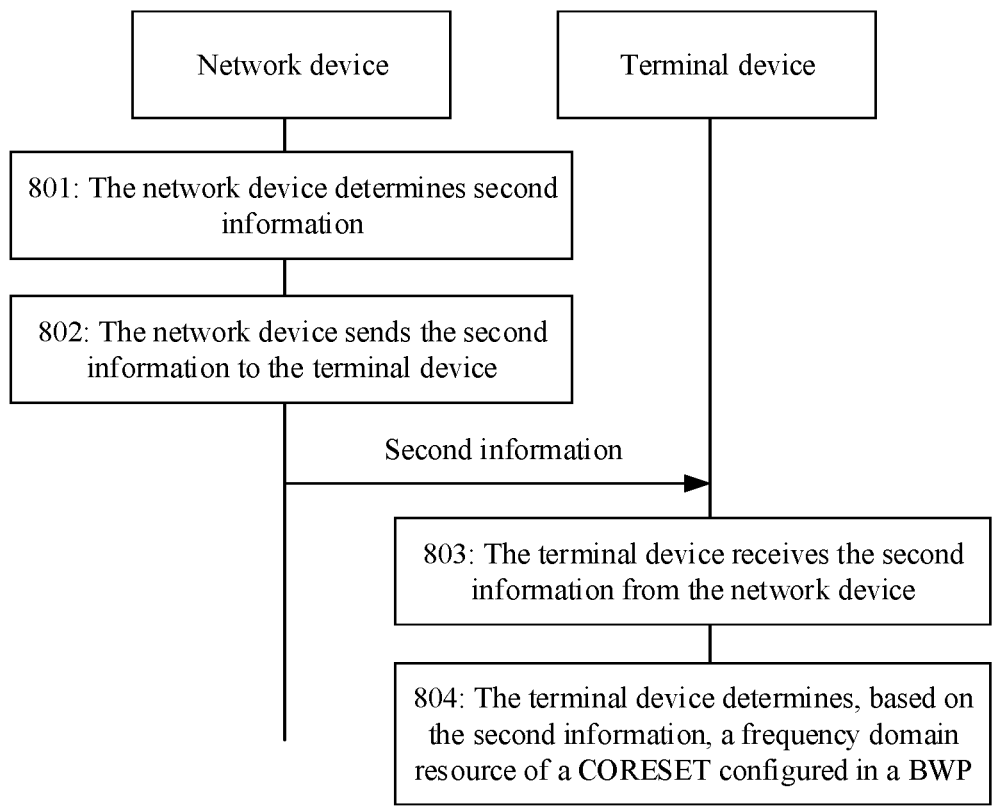
FIG. 8 is a schematic flowchart of a resource configuration method according to an embodiment of this application.

Further, the network device may further indicate, to the terminal device, a frequency domain resource of a CORESET configured in the BWP. FIG. 8 is a schematic flowchart of a resource configuration method according to an embodiment of this application. Referring to FIG. 8, the method includes the following steps.

Step 801: A network device determines second information.

Step 802: The network device sends the second information to a terminal device.

The second information indicates a frequency domain resource of a CORESET configured in a BWP.

Step 803: The terminal device receives the second information from the network device.

Step 804: The terminal device determines, based on the second information, the frequency domain resource of the CORESET configured in the BWP.

It should be noted that the second information may be sent by using RRC signaling, for example, may be carried by using a frequency domain resource (frequencyDomainResources) field in the RRC signaling.

The second information may be a bitmap including at least one bit, and each bit in the bitmap corresponds to one RB or corresponds to one non-overlapping group including six consecutive RBs. For example, if a corresponding bit in the bitmap is 1, a corresponding RB group is used for the CORESET; or if a corresponding bit in the bitmap is 0, a corresponding RB group is not used for the CORESET.

In some embodiments, a quantity of bits included in the second information is determined based on a maximum transmission bandwidth supported by the terminal device or an operating bandwidth preferred by the terminal device.

For example, the quantity of bits included in the second information is $\lfloor \log_2 N \rfloor$, $\lceil \log_2 N \rceil$, $\lfloor \log_2(N/6) \rfloor$, or $\lceil \log_2(N/6) \rceil$. N is a quantity of consecutive RBs included in the maximum transmission bandwidth supported by the terminal device or the operating bandwidth preferred by the terminal device, and $\lceil \ \rceil$ represents rounding up.

The quantity of bits included in the second information is determined based on the maximum transmission bandwidth supported by the terminal device or the operating bandwidth preferred by the terminal device. Therefore, compared with a conventional technology, the second information is always configured based on 270 RBs, so that the quantity of bits included in the second information can be reduced, thereby reducing signaling overheads. A terminal device with a reduced capability (REDCAP) is used as an example. A maximum transmission bandwidth supported by UE in an FR1 is 20 MHz, and a corresponding maximum transmission bandwidth supported is expressed in RBs, as 106 RBs. In the foregoing manner, the quantity of bits included in the second information indicating the frequency domain resource of the CORESET may be 17, so that signaling overheads can be significantly reduced compared with 45 fixed bits in the conventional technology.

It should be noted that, the maximum transmission bandwidth supported by the terminal device or the operating bandwidth preferred by the terminal device may be indicated by the terminal device to the network device. For example, the terminal device may send third information to the network device. Some implementations of the third information are not limited to these embodiments. Details are not described herein. In embodiments of this application, the procedure shown in FIG. 4 and the procedure shown in FIG. 8 may be implemented separately or in combination. This is not limited in embodiments of this application.

The various embodiments described in this specification may be independent solutions, or may be combined according to internal logic. The solutions all fall within the protection scope of this application.

In the foregoing embodiments provided in this application, the methods provided in embodiments of this application are separately described from a perspective of interaction between devices. To implement the functions in the methods provided in the foregoing embodiments of this application, the network device or the terminal device may include a hardware structure and/or a software module, and implement the functions in a form of the hardware structure, the software module, or a combination of the hardware structure and the software module. Whether one of the foregoing functions is performed by using the hardware structure, the software module, or the combination of the hardware structure and the software module depends on a specific application and a design constraint of the technical solutions.

In embodiments of this application, module division is an example, and is merely a logical function division. During actual implementation, there may be another division manner. In addition, functional modules in embodiments of this application may be integrated into one processor, or each of the modules may exist alone physically, or two or more modules may be integrated into one module. The integrated module may be implemented in a form of hardware, or may be implemented in a form of a software functional module.

Figure 9:
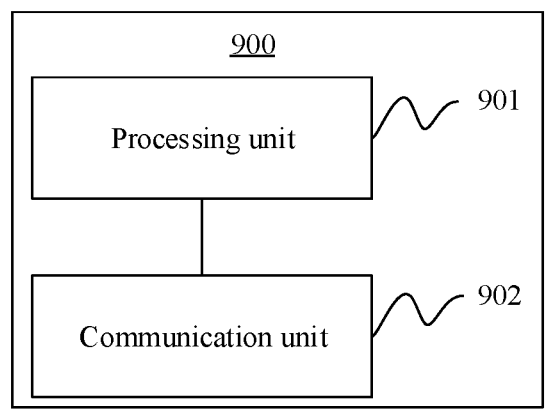
FIG. 9 is a schematic diagram of a structure of a communication apparatus according to an embodiment of this application.

Similar to the foregoing concept, as shown in FIG. 9, an embodiment of this application further provides an apparatus 900 configured to implement the functions of the network device or the terminal device in the foregoing method. For example, the apparatus may be a software module or a chip system. In some embodiments, the chip system may include a chip, or may include a chip and another discrete component (e.g., circuitry). The apparatus 900 may include a processing unit 901 and a communication unit 902.

In some embodiments, the communication unit may also be referred to as a transceiver unit (e.g., a transceiver circuit), and may include a sending unit (e.g., a sending circuit) and/or a receiving unit (e.g., a receiving circuit), respectively configured to perform the steps of sending and receiving by the network device or the terminal device in the foregoing method embodiments.

When the communication apparatus 900 executes the functions of the network device, the processing unit is configured to determine a bandwidth part BWP configured for a terminal device; and the communication unit is configured to send first information to the terminal device, where the first information indicates a serial number $N_{BWP}^{start}$ of a common resource block CRB corresponding to a start resource block RB of the BWP and a quantity $L_{RBs}$ of consecutive RBs occupied by the BWP, where the serial number $N_{BWP}^{start}$ of the CRB corresponding to the start RB of the BWP and the quantity $L_{RBs}$ of consecutive RBs occupied by the BWP meet one or more of the following conditions:

$N_{BWP}^{start}$ mod K=0; and $(N_{BWP}^{start}+L_{RBs})$mod K=0, where mod is a remainder operation, and K is a positive integer.

In a possible implementation, $L_{RBs}$ further meets the following condition: $L_{RBs}$ is less than or equal to L, where L is a quantity of consecutive RBs included in a maximum transmission bandwidth supported by the terminal device or an operating bandwidth preferred by the terminal device.

In a possible implementation, $L_{RBs}$ further meets the following condition: $L_{RBs}$ mod K=0.

In a possible implementation, the communication unit is further configured to send second information to the terminal device, where the second information indicates a frequency domain resource of a control-resource set CORESET configured in the BWP, and a quantity of bits included in the second information is determined based on the maximum transmission bandwidth supported by the terminal device or the operating bandwidth preferred by the terminal device.

In a possible implementation, the quantity of bits included in the second information is $\lfloor \log_2 N \rfloor$, $\lceil \log_2 N \rceil$, $\lfloor \log_2(N/6) \rfloor$, or $\lceil \log_2(N/6) \rceil$, where N is a quantity of consecutive RBs included in the maximum transmission bandwidth supported by the terminal device or the operating bandwidth preferred by the terminal device, $\lfloor \ \rfloor$ represents rounding down, and $\lceil \ \rceil$ represents rounding up.

In a possible implementation, the first information is an index value of a RIV, or the first information is a RIV.

When the communication apparatus 900 executes the functions of the terminal device, the communication unit is configured to receive first information from a network device; and the processing unit is configured to determine a bandwidth part BWP based on the first information; where the first information indicates a serial number $N_{BWP}^{start}$ of a common resource block CRB corresponding to a start resource block RB of the BWP and a quantity $L_{RBs}$ of consecutive RBs occupied by the BWP; and the serial number $N_{BWP}^{start}$ of the CRB corresponding to the start RB of the BWP and the quantity $L_{RBs}$ of consecutive RBs occupied by the BWP meet one or more of the following conditions:

$N_{BWP}^{start}$ mod K=0; and $(N_{BWP}^{start}+L_{RBs})$mod K=0, where mod is a remainder operation, and K is a positive integer.

In a possible implementation, $L_{RBs}$ further meets the following condition: $L_{RBs}$ is less than or equal to L, where L is a quantity of consecutive RBs included in a maximum transmission bandwidth supported by the terminal device or an operating bandwidth preferred by the terminal device.

In a possible implementation, $L_{RBs}$ further meets the following condition: $L_{RBs}$ mod K=0.

In a possible implementation, the communication unit is further configured to receive second information from the network device, where the second information indicates a frequency domain resource of a CORESET configured in the BWP, and a quantity of bits included in the second information is determined based on the maximum transmission bandwidth supported by the terminal device or the operating bandwidth preferred by the terminal device.

In a possible implementation, the quantity of bits included in the second information is $\lfloor \log_2 N \rfloor$, $\lceil \log_2 N \rceil$, $\lfloor \log_2(N/6) \rfloor$, or $\lceil \log_2(N/6) \rceil$. N is a quantity of consecutive RBs included in the maximum transmission bandwidth supported by the terminal device or the operating bandwidth preferred by the terminal device, $\lfloor \ \rfloor$ represents rounding down, and $\lceil \ \rceil$ represents rounding up.

In a possible implementation, the first information is an index value of a resource indication value RIV, or the first information is a RIV.

The communication apparatus provided in some embodiments is described below in detail with reference to FIG. 9 and FIG. 10. It should be understood that the descriptions of the apparatus embodiment correspond to the descriptions of the method embodiment. Therefore, for content not described in detail, refer to the foregoing method embodiment. For brevity, details are not described herein again.

The communication unit may also be referred to as a transceiver, a transceiver apparatus, or the like. The processing unit may also be referred to as a processor, a processing board, a processing module, a processing apparatus, or the like. Optionally, a device for implementing a receiving function in the communication unit 902 may be considered as a receiving unit, and a device for implementing a sending function in the communication unit 902 may be considered as a sending unit. In other words, the communication unit 902 includes the receiving unit and the sending unit. The communication unit sometimes may also be referred to as a transceiver, a transceiver circuit, or the like. The receiving unit sometimes may also be referred to as a receiver, a receiver circuit, or the like. The sending unit may also be sometimes referred to as a transmitter, a transmitter circuit, or the like.

Figure 10:
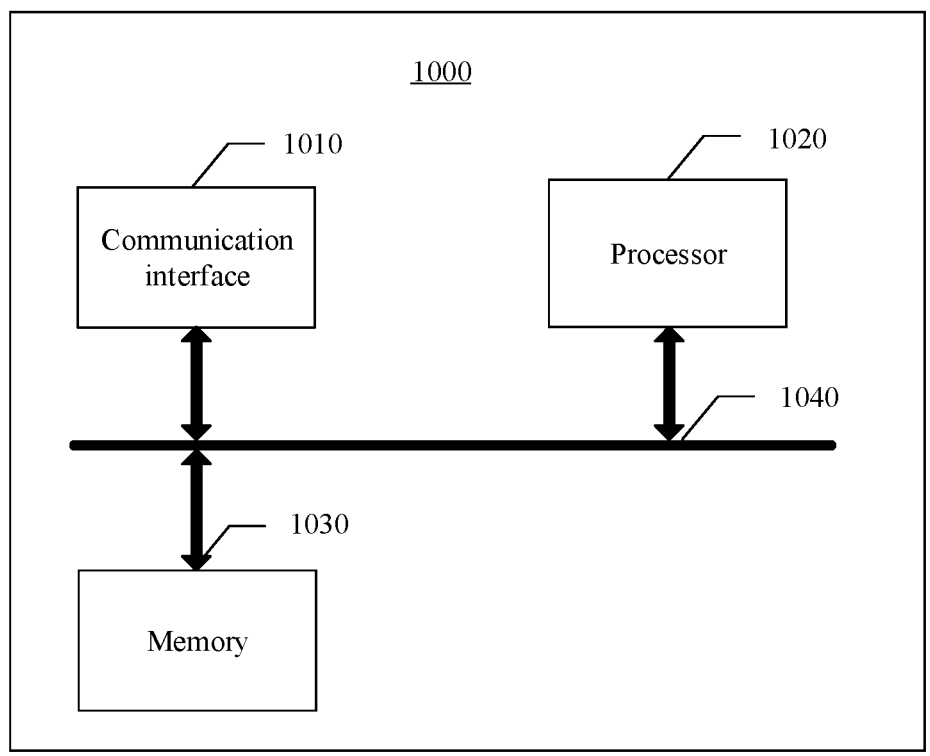
FIG. 10 is a schematic diagram of a structure of a communication apparatus according to an embodiment of this application.

FIG. 10 shows an apparatus 1000 according to an embodiment of this application.

The apparatus shown in FIG. 10 may be an implementation of a hardware circuit of the apparatus shown in FIG. 9. The communication apparatus is applicable to the flowchart described above, and is configured to execute the functions of the network device or the terminal device in the foregoing method embodiment. For ease of description, FIG. 10 shows only main components of the communication apparatus.

The apparatus 1000 may further include at least one memory 1030, configured to store program instructions and/or data. The memory 1030 is coupled to a processor 1020. The coupling in some embodiments is indirect coupling or a communication connection between apparatuses, units, or modules for information exchange between the apparatuses, the units, or the modules, and may be in electrical, mechanical, or other forms. The processor 1020 may cooperate with the memory 1030. The processor 1020 may execute the program instructions stored in the memory 1030. At least one of the at least one memory may be included in the processor.

The apparatus 1000 shown in FIG. 10 includes at least one processor 1020 and a communication interface 1010. The processor 1020 is configured to execute instructions or a program stored in the memory 1030. When the instructions or the program stored in the memory 1030 is executed, the processor 1020 is configured to perform the operations performed by the processing unit 901 in the foregoing embodiment, and the communication interface 1010 is configured to perform the operations performed by the communication unit 902 in the foregoing embodiment. For details, refer to the foregoing descriptions. Details are not described herein again.

In some embodiments, the communication interface may be a transceiver, a circuit, a bus, a module, or a communication interface of another type. In some embodiments, when the communication interface is a transceiver, the transceiver may include an independent receiver and an independent transmitter; or may be a transceiver integrating receiving and sending functions, or a communication interface.

The apparatus 1000 may further include a communication line 1040. The communication interface 1010, the processor 1020, and the memory 1030 may be connected to each other by using the communication line 1040. The communication line 1040 may be a peripheral component interconnect (PCI for short) bus, an extended industry standard structure (EISA for short) bus, or the like. The communication line 1040 may be classified into an address bus, a data bus, a control bus, or the like. For ease of representation, only one thick line is for representing the bus in FIG. 10, but this does not mean that there is only one bus or only one type of bus.

A person skilled in the art should understand that embodiments of this application may be provided as a method, a system, or a computer program product. Therefore, this application may use a form of a hardware-only embodiment, a software-only embodiment, or an embodiment with a combination of software and hardware. Moreover, this application may use a form of a computer program product that is implemented on one or more computer-usable storage media (including but not limited to a disk memory, an optical memory, and the like) that include computer-usable program code.

This application is described with reference to the flowcharts and/or block diagrams of the method, the device (system), and the computer program product according to this application. It should be understood that computer program instructions may be for implementing each process and/or each block in the flowcharts and/or the block diagrams and a combination of a process and/or a block in the flowcharts and/or the block diagrams. The computer program instructions may be provided for a general-purpose computer, a dedicated computer, an embedded processor, or a processor of another programmable data processing device to generate a machine, so that the instructions executed by the computer or the processor of the another programmable data processing device generate an apparatus for implementing a specific function in one or more processes in the flowcharts and/or in one or more blocks in the block diagrams.

The computer program instructions may alternatively be stored in a computer-readable memory that can indicate a computer or another programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

It is clear that a person skilled in the art can make various modifications and variations to this application without departing from the scope of this application. In this way, this application is intended to cover these modifications and variations of this application provided that they fall within the scope of the following claims and their equivalent technologies of this application.

What is claimed is:

1. A resource configuration method applied to a network device, comprising:
   determining a bandwidth part (BWP) configured for a terminal device; and
   sending first information to the terminal device, wherein the first information indicates a serial number $N_{BWP}^{start}$ of a common resource block (CRB) corresponding to a start resource block (RB) of the BWP and a quantity $L_{RBs}$ of consecutive RBs occupied by the BWP, and
   wherein the serial number $N_{BWP}^{start}$ of the CRB corresponding to the start RB of the BWP and the quantity $L_{RBs}$ of consecutive RBs occupied by the BWP meet one or more of the following conditions:
   $N_{BWP}^{start}$ mod K=0; or $(N_{BWP}^{start} + L_{RBs})$ mod K=0, wherein mod is a remainder operation, and K is a positive integer.

2. The method according to claim 1, wherein $L_{RBs}$ further meets the following condition:
   $L_{RBs}$ is less than or equal to L, wherein
   L is a quantity of consecutive RBs comprised in a maximum transmission bandwidth supported by the terminal device or an operating bandwidth preferred by the terminal device.

3. The method according to claim 1, wherein $L_{RBs}$ further meets the following condition:
   $L_{RBs}$ mod K=0.

4. The method according to claim 2, wherein the method further comprises:
   sending second information to the terminal device, wherein the second information indicates a frequency domain resource of a control-resource set (CORESET) configured in the BWP, and a quantity of bits comprised in the second information is determined based on the maximum transmission bandwidth supported by the terminal device or the operating bandwidth preferred by the terminal device.

5. The method according to claim 4, wherein the quantity of bits comprised in the second information is $\lfloor \log_2 N \rfloor$, $\lceil \log_2 N \rceil$, $\lfloor \log_2(N/6) \rfloor$, or $\lceil \log_2(N/6) \rceil$, wherein
   N is a quantity of consecutive RBs comprised in the maximum transmission bandwidth supported by the terminal device or the operating bandwidth preferred by the terminal device, $\lfloor \ \rfloor$ represents rounding down, and $\lceil \ \rceil$ represents rounding up.

6. The method according to claim 1, wherein the first information is an index value of a resource indication value (RIV), or the first information is a RIV.

7. The method according to claim 2, wherein the method further comprises:
   receiving third information from the terminal device, wherein the third information indicates the maximum transmission bandwidth supported by the terminal device or the operating bandwidth preferred by the terminal device; and determining, based on the third information, the maximum transmission bandwidth supported by the terminal device or the operating bandwidth preferred by the terminal device.

8. The method according to claim 1, wherein K is a preset value, or a value of K is sent by the network device to the terminal device.

9. A resource configuration method applied to a terminal device, comprising:

receiving first information from a network device; and determining a bandwidth part (BWP) based on the first information;

wherein the first information indicates a serial number $N_{BWP}^{start}$ of a common resource block (CRB) corresponding to a start resource block (RB) of the BWP and a quantity $L_{RBs}$ of consecutive RBs occupied by the BWP; and wherein the serial number $N_{BWP}^{start}$ of the CRB corresponding to the start RB of the BWP and the quantity $L_{RBs}$ of consecutive RBs occupied by the BWP meet one or more of the following conditions:

$N_{BWP}^{start}$ mod K=0; or ($N_{BWP}^{start}+L_{RBs}$) mod K=0, wherein mod is a remainder operation, and K is a positive integer.

10. The method according to claim 9, wherein $L_{RBs}$ further meets the following condition:

$L_{RBs}$ is less than or equal to L, wherein

L is a quantity of consecutive RBs comprised in a maximum transmission bandwidth supported by the terminal device or an operating bandwidth preferred by the terminal device.

11. The method according to claim 9, wherein $L_{RBs}$ further meets the following condition:

$L_{RBs}$ mod K=0.

12. The method according to claim 10, wherein the method further comprises:

receiving second information from the network device, wherein the second information indicates a frequency domain resource of a control-resource set (CORESET) configured in the BWP, and a quantity of bits comprised in the second information is determined based on the maximum transmission bandwidth supported by the terminal device or the operating bandwidth preferred by the terminal device.

13. The method according to claim 12, wherein the quantity of bits comprised in the second information is $\lfloor \log_2 N \rfloor$, $\lceil \log_2 N \rceil$, $\lfloor \log_2(N/6) \rfloor$, or $\lceil \log_2(N/6) \rceil$, wherein N is a quantity of consecutive RBs comprised in the maximum transmission bandwidth supported by the terminal device or the operating bandwidth preferred by the terminal device, $\lfloor \ \rfloor$ represents rounding down, and $\lceil \ \rceil$ represents rounding up.

14. The method according to claim 9, wherein the first information is an index value of a resource indication value (RIV), or the first information is a RIV.

15. A communication apparatus, comprising:

at least one processor; and at least one memory coupled to the at least one processor and storing instructions that, when the instructions are performed by the at least one processor, cause the apparatus to:

determine a bandwidth part (BWP) configured for a terminal device; and send first information to the terminal device;

wherein the first information indicates a serial number $N_{BWP}^{start}$ of a common resource block (CRB) corresponding to a start resource block (RB) of the BWP and a quantity $L_{RBs}$ of consecutive RBs occupied by the BWP; and wherein the serial number $N_{BWP}^{start}$ of the CRB corresponding to the start RB of the BWP and the quantity $L_{RBs}$ of consecutive RBs occupied by the BWP meet one or more of the following conditions:

$N_{BWP}^{start}$ mod K=0; or ($N_{BWP}^{start}+L_{RBs}$) mod K=0, wherein mod is a remainder operation, and K is a positive integer.

16. The apparatus according to claim 15, wherein $L_{RBs}$ further meets the following condition:

$L_{RBs}$ is less than or equal to L, wherein

L is a quantity of consecutive RBs comprised in a maximum transmission bandwidth supported by the terminal device or an operating bandwidth preferred by the terminal device.

17. The apparatus according to claim 15, wherein $L_{RBs}$ further meets the following condition:

$L_{RBs}$ mod K=0.

18. A resource configuration apparatus, comprising:

at least one processor; and at least one memory coupled to the at least one processor and storing instructions that, when the instructions are performed by the at least one processor, cause the apparatus to:

receive first information from a network device; and determine a bandwidth part (BWP) based on the first information;

wherein the first information indicates a serial number $N_{BWP}^{start}$ of a common resource block (CRB) corresponding to a start resource block (RB) of the BWP and a quantity $L_{RBs}$ of consecutive RBs occupied by the BWP; and wherein the serial number $N_{BWP}^{start}$ of the CRB corresponding to the start RB of the BWP and the quantity $L_{RBs}$ of consecutive RBs occupied by the BWP meet one or more of the following conditions:

$N_{BWP}^{start}$ mod K=0; or ($N_{BWP}^{start}+L_{RBs}$) mod K=0, wherein mod is a remainder operation, and K is a positive integer.

19. The apparatus according to claim 18, wherein $L_{RBs}$ further meets the following condition:

$L_{RBs}$ is less than or equal to L, wherein

L is a quantity of consecutive RBs comprised in a maximum transmission bandwidth supported by a terminal device or an operating bandwidth preferred by the terminal device.

20. The apparatus according to claim 18, wherein $L_{RBs}$ further meets the following condition:

$L_{RBs}$ mod K=0.

* * * * *

UNITED STATES PATENT AND TRADEMARK OFFICE
CERTIFICATE OF CORRECTION

PATENT NO. : 12,395,303 B2  
APPLICATION NO. : 18/163601  
DATED : August 19, 2025  
INVENTOR(S) : Zhihu Luo et al.

Page 1 of 1

It is certified that error appears in the above-identified patent and that said Letters Patent is hereby corrected as shown below:

In the Claims

In Column 16, Claim 1, Line 30, delete "$(N_{BWP}^{start} +L_{RBs})$" and insert -- $(N_{BWP}^{start}+L_{RBs})$ --, therefor.

Signed and Sealed this  
Twenty-third Day of December, 2025

John A. Squires  
*Director of the United States Patent and Trademark Office*